United States Patent

Baldwin

[15] 3,651,535
[45] Mar. 28, 1972

[54] ELECTRICAL SYSTEMS FOR ROAD VEHICLES

[72] Inventor: John Granville Baldwin, Burnley, England
[73] Assignee: Joseph Lucas (Industries) Limited, Birmingham, England
[22] Filed: July 9, 1970
[21] Appl. No.: 53,383

[30] Foreign Application Priority Data

Aug. 11, 1969 Great Britain......................40,007/69

[52] U.S. Cl. .................................15/250.02, 318/DIG. 2
[51] Int. Cl. .........................................................B60s 1/02
[58] Field of Search ..................318/DIG. 2, 101; 15/250.02, 15/250.12, 250.16, 250.17

[56] References Cited

UNITED STATES PATENTS 3,483,584 12/1969 Patterson..........................15/250.02
3,112,510 12/1963 Forbush.............................15/250.17

Primary Examiner—Bernard A. Gilheany
Assistant Examiner—Thomas Langer
Attorney—Holman & Stern

[57] ABSTRACT

In an electrical system for a road vehicle, a manually operable switch controls one electrical circuit of a vehicle. The switch has a metallic part associated with it, and this metallic part acts as the sensing element of a proximity switch which controls another electrical circuit of the road vehicle. One circuit may be the windshield wiper circuit, and the other the windshield washer circuit.

1 Claims, 5 Drawing Figures

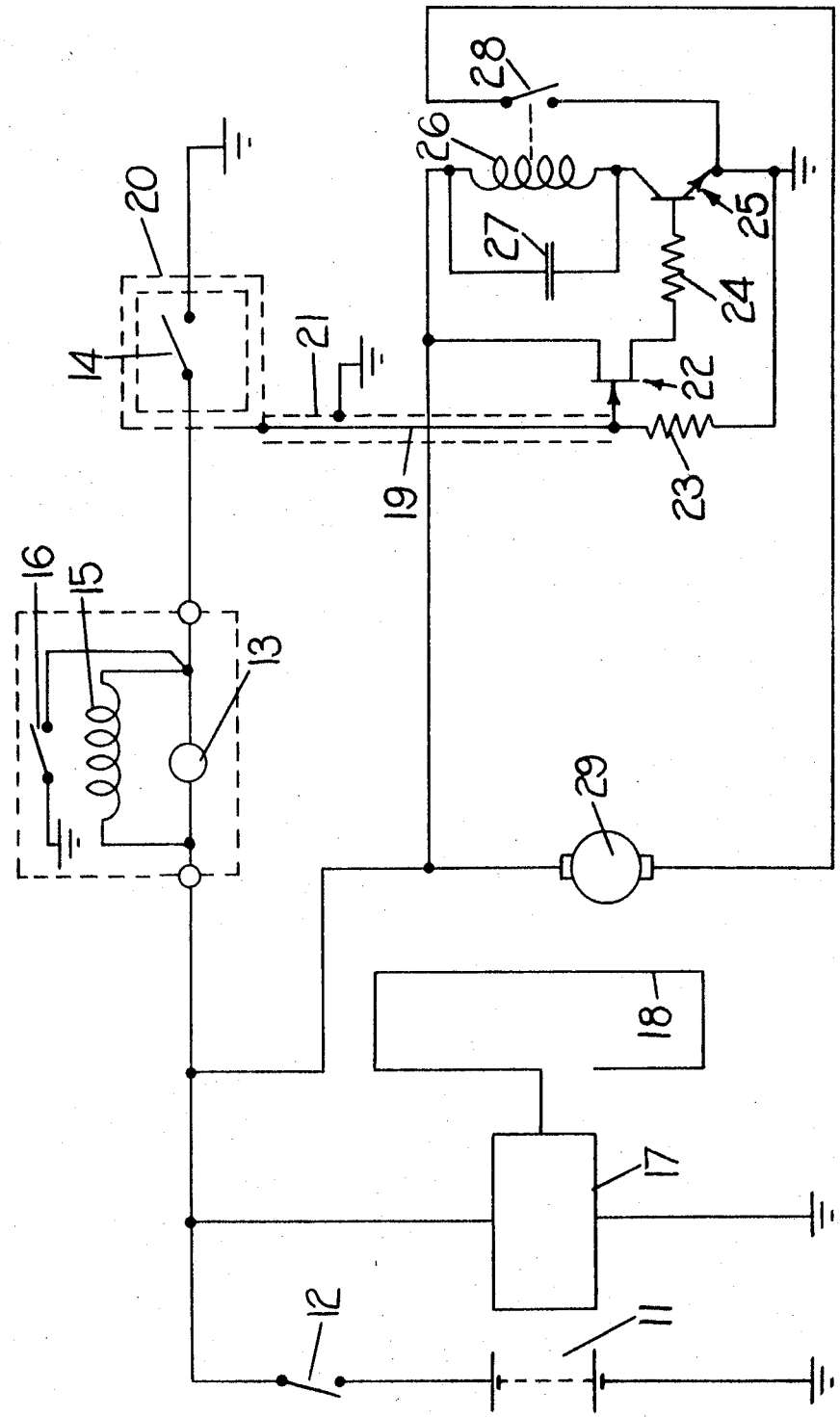

ELECTRICAL SYSTEMS FOR ROAD VEHICLES

This invention relates to electrical systems for road vehicles.

A system in accordance with the invention comprises in combination a manually operable switch which controls one electrical circuit of the vehicle, and a metallic part associated with said switch and acting as the sensing element of a proximity switch controlling another electrical circuit of the road vehicle.

The accompanying drawing is a circuit diagram illustrating one example of the invention.

Referring to the drawing, the vehicle battery 11 has its negative terminal earthed and its positive terminal connected through the vehicle ignition switch 12 to one side of the armature 13 of a windscreen wiper motor, the other side of the armature 13 being connected through a manually operable switch 14 to earth. The armature 13 is bridged by the field winding 15 of the motor, whilst the junction of the armature 13 and switch 14 is connected to earth through a parking switch 16. The switch 14 can take a variety of forms, depending on the type of windscreen wiper motor employed, but for convenience the drawing shows a simple single speed motor which is operated when the switch 14 is closed, and drives the parking switch 16 so that when the switch 14 is opened again, the circuit to the motor is completed by way of the switch 16 until the wipers are in their parking position, at which point the switch 16 opens to stop the motor.

The battery also provides power to an oscillator 17 the output from which is fed to an aerial 18 mounted within the vehicle. Typically, the oscillator produces a 5 kc./sec. sine wave output with a peak-to-peak voltage of 200 volts.

The switch 14 incorporates a metallized bezel 20 to which is electrically connected a lead 19 surrounded by a screened cable 21 which is earthed as shown. The lead 19 is connected to the gate of a field effect transistor 22, the gate further being earthed through a resistor 23. The drain of the transistor 22 is connected through the switch 12 to the positive battery terminal, whilst its source is connected through a resistor 24 to the base of an NPN-transistor 25, the emitter of which is earthed and the collector of which is connected through the coil 26 of a relay and the switch 12 in series to the positive battery terminal. The coil 26 is bridged by a capacitor 27, and when energized closes a contact 28 connected between the emitter of the transistor 25 and one side of a screen washer motor 29, the other side of which is connected to the positive battery terminal through the switch 12.

When it is desired to operate the windscreen wipers, the switch 14 is operated as described above. However, if it is desired to wash the screen, then the driver touches the metallized bezel 20 so that energy transmitted by the aerial 18 is supplied to the gate of the transistor 22 to turn it on, thereby providing base current to the transistor 25 to energize the relay 26, which closes the contact 28 and completes the earth connection of the motor 29, which provides water to the windscreen. When the driver removes his finger from the bezel 20, the transistor 22 is turned off and the motor 29 ceases to operate.

The arrangement can of course be used to control other functions in a road vehicle.

If desired, the sensitivity of the system can be arranged so that it is not necessary to touch the bezel, as long as the driver's finger is placed close to the bezel. However, it is of course important that the sensitivity is adjusted so that the proximity switch is not operated inadvertently, and for this reason it is normally preferable to arrange that the bezel must be touched.

Having thus described my invention what I claim as new and desire to secure by Letters Patent is:

1. An electrical system for a road vehicle comprising in combination a battery, an oscillator driven by the battery and providing an output to an aerial mounted within the vehicle, a windscreen wiper motor connected in series with a manually operable switch across the battery, so that the manually operable switch when closed operates the windscreen wiper motor, a metallic bezel forming part of the switch, and a switching circuit means operable by energy transmitted from the aerial by way of the bezel when the bezel is touched to turn on a windscreen washer motor on the road vehicle.

* * * * *